Feb. 28, 1956 C. B. SHEPPARD ET AL 2,736,823
ACOUSTIC TRANSDUCER AND DAMPING ASSEMBLY
Filed March 31, 1952 2 Sheets-Sheet 1
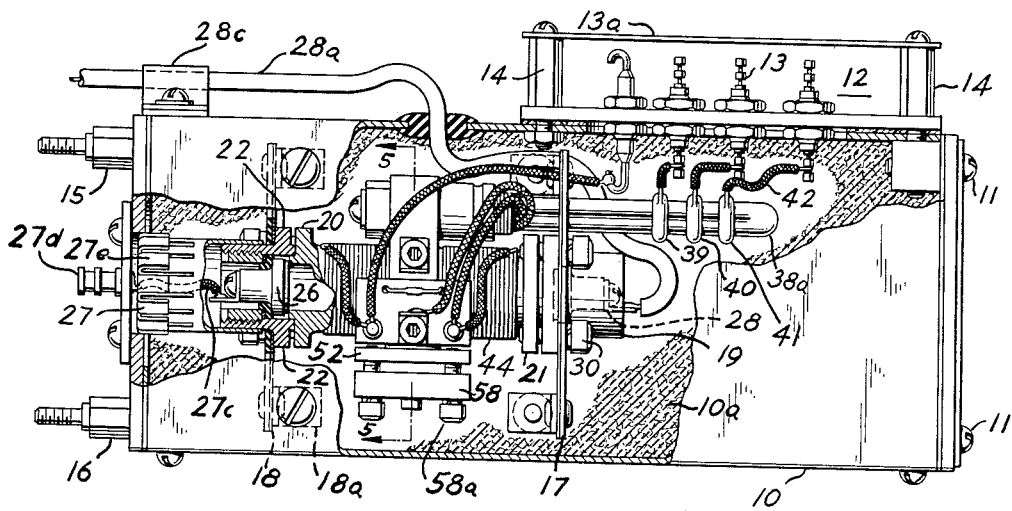
FIG. 2
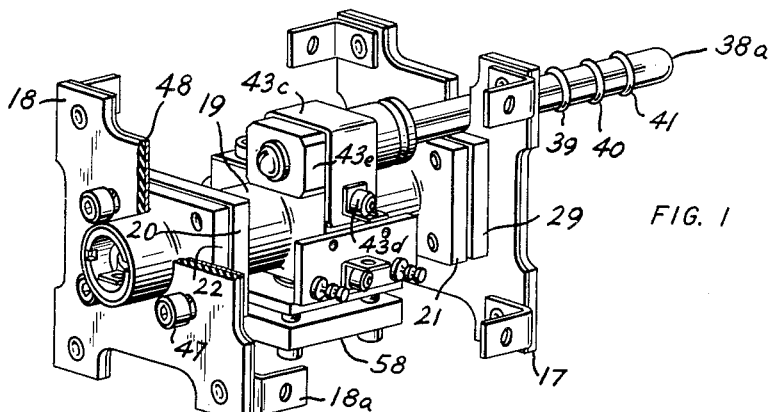
FIG. 1
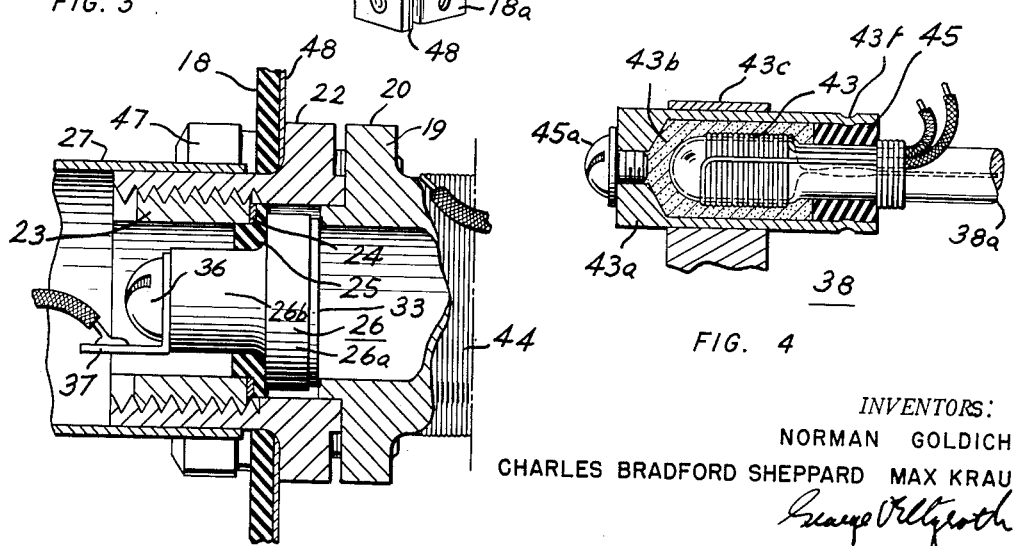
FIG. 3
FIG. 4
INVENTORS:
NORMAN GOLDICH
CHARLES BRADFORD SHEPPARD  MAX KRAUS
ATTORNEY Feb. 28, 1956     C. B. SHEPPARD ET AL     2,736,823
ACOUSTIC TRANSDUCER AND DAMPING ASSEMBLY
Filed March 31, 1952     2 Sheets-Sheet 2
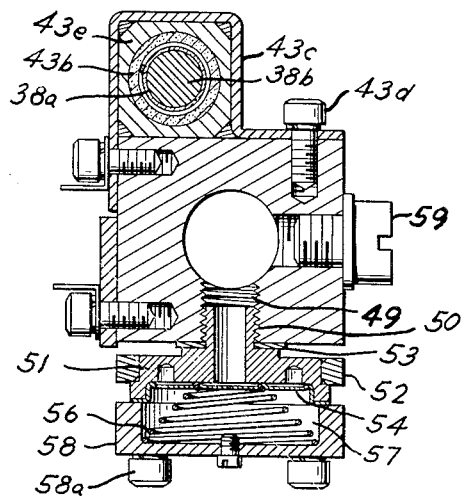
FIG. 5
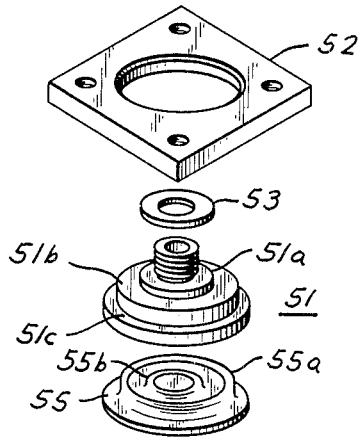
FIG. 6
FIG. 7
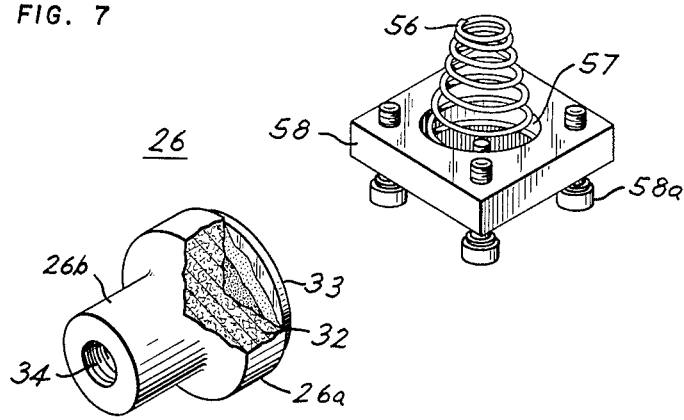
INVENTORS:
NORMAN GOLDICH
CHARLES BRADFORD SHEPPARD    MAX KRAUS
ATTORNEY

United States Patent Office

2,736,823
Patented Feb. 28, 1956

2,736,823

ACOUSTIC TRANSDUCER AND DAMPING ASSEMBLY

Charles Bradford Sheppard, Meadowbrook, Norman H. Goldich, Bala-Cynwyd, and Max H. Kraus, Elkins Park, Pa., assignors, by mesne assignments, to Sperry Rand Corporation, New York, N. Y., a corporation of Delaware Application March 31, 1952, Serial No. 279,709

4 Claims. (Cl. 310—8.2)

This invention relates in general to an improved mercury storage system for electronic computing apparatus.

One of the problems associated with the operation of high speed electronic computing apparatus has been the necessity for an adequate memory storage system capable of receiving and retaining pulse excitations of the order of microseconds. Of the various systems proposed, the mercury sonic delay system, as described in an article in the Proceedings of the Institute of Radio Engineers, entitled "Mercury Delay Line Memory Using a Pulse Rate of Several Megacycles," published under date of August 1949, has provided certain operating advantages over other methods. However, in practice certain factors are encountered which may impede the transmission of the pulses passing through the delay line. For example, it is known that:

1. The speed of sound passing through the mercury delay line is subject to considerable variation in accordance with changes in temperature. Hence, to assure a uniform transmission, the mercury should be maintained at a substantially constant temperature, and this is accomplished in accordance with the design and construction provided.

2. Acoustic waves reflected between the receiving crystal transducer and the transmitting transducer via the mercury in the tank, are a source of interference with the normal functioning of the associated pulse circuits of the electronic computing apparatus, occasioning considerable loss of time in view of the necessity for repetitions, stoppages, etc., as will be described more fully hereinafter.

It is to be noted that when waves are propagated from one medium into another, refraction takes place; also when various objects or surfaces are struck by advancing wave fronts, reflections occur in accordance with the laws of incidence and refraction. In the field of electromagnetic transmission and reception, for example, radar presents the problem of elimination of ground clutter reflections from various objects other than the target sought. In coping with such radar interference, acoustic memory delay columns have been used together with clipping circuits and acoustic terminations to enable the observer or operator to reduce the interfering reflections to a point where satisfactory reception may be attained.

However, in electronic computing apparatus, the slightest reflection of sonic waves from the receiving transducer and back through the sonic mercury delay line may occasion a cumulative series of interfering pulses sufficient to cause suppression or addition of pulses, thereby destroying the significance of an entire sequence of the said pulses or halting of the normal functioning of the apparatus.

With respect to the second problem, it is a salient object and feature of this invention to provide novel acoustic damping means which are effective to prevent or minimize sound reflections from the receiving crystal transducer back through the mercury sonic delay line.

Another object of the invention is to provide new and novel means effective to maintain the mercury at a uniform temperature in the tank.

Another object is to provide a mercury sonic delay line of generally improved type and capable of affording a reliable result in electronic computing apparatus.

A further object is to provide a new article of manufacture in the form of a combination transducer and sonic damper.

With the above and other objects in view, the invention resides in the design and construction and in the combination and arrangement of parts, and will be best understood when taken in connection with the accompanying drawings wherein:

Figure 1 is a perspective view of the essential elements of a mercury acoustic information storage apparatus embodying a typical form of the invention, the casing and certain parts of the apparatus being omitted for clarity of illustration;

Figure 2 is a side elevational view of the apparatus; partly in section, and with portions of the casing broken away;

Figure 3 is an enlarged, fragmental detail sectional view of the left hand end of the mercury tank assembly and showing one of the novel transducer and sonic damper assemblies operatively assembled;

Figure 4 is an enlarged fragmentary detail sectional view of the thermal link between the temperature-controlling unit and the mercury-containing tank;

Figure 5 is an enlarged detail view, taken on line 5—5 of Figure 2, as seen in the direction of the arrows, and showing the means employed for maintaining a uniform pressure of the mercury within the thermally controlled member;

Figure 6 is an enlarged, exploded perspective view of the component parts of the pressure-regulating closure; and Figure 7 is an enlarged, perspective detail view, with portions broken away, of the crystal transducer and damper assembly.

In the drawings, the numeral 10 designates a metallic casing of approximately rectangular configuration, and whose sides, bottom and top may be secured together in any suitable manner, as by screws 11.

As hereinafter described, the casing 10 contains a quantity of suitable insulating material, which may be granular in texture and wherein the mercury tank and other associated components are embedded. The casing 10 has secured to the top thereof a terminal post assembly, designated generally at 12 and including the soldering terminal posts 13. This assembly also includes an overhead protective strip 13a that may be formed of any suitable material, such as mica, and fastened to the top of spacer posts as at 14, the spacer posts in turn being anchored to the casing 10. A pair of threaded studs 15, 16 projecting from one end of the casing 10 permits the entire device to be fastened to the associated electronic computing apparatus (not shown).

Referring to the mercury tank assembly in the casing 10, a pair of end frames or supports 17, 18 formed of a suitable material such as Bakelite and having anchoring lugs, as at 18a, are arranged in opposed parallel relation. A mercury tank 19 is fastened to and supported by these end frames.

The mercury tank is formed of metal (stainless steel, such as the #304 alloy thereof, has been found suitable) and such alloy is preferable to other metals, such as copper or aluminum which are wet by mercury and consequently at least partially amalgamable with mercury. The tank 19 has two combination transducer and damper assemblies, one at each end, and is integrally formed with rectangular opposed end flanges, as at 20, 21. The flange 20 is juxtaposed against the adjacent end of a flanged collar 22 whose inner periphery threadedly accommodates a retaining nut 23. The nut 23 engages a spring 24 in abutment with an insulating ring 25, in turn pressing against an adjacent combination transducer and sonic damper 26 which closes the adjacent left hand end of the mercury tank 19 and serves as the receiving transducer.

A high frequency shield, designated generally at 27, encircles a portion of the flanged collar 22 and has its outer end accommodated in a shallow pocket 27a formed by the juxtaposition of the left hand plate 10a of the casing 10 and a disc 27b formed of suitable insulating material. By inspection of flange 20 it will be seen that the high frequency shield 27, which it will be understood is grounded via the metallic casing 10, also encircles the output lead 27c from the transducer assembly 26 to the exterior soldering post 27d. The high frequency shield 27, it may be explained, is formed of a suitable metal or alloy, such as beryllium copper, with a silver plating upon its exterior, and is also provided with folded over tines, as at 27e, which serve as resilient securing means to retain the shield as a whole in the operative position shown.

A substantially similar combination transducer and damper assembly 28 is shown in dotted lines at the right hand end of the mercury tank 19. This assembly 28 is connected by a lead 28a therefrom to the associated electronic computing apparatus. The lead 28a is shielded in any suitable manner, as by a metallic braid (not shown) and in turn fastened to the exterior of the casing 10 by a clamping bracket 28c. By shielding the lead 28a in the manner indicated, possible radiation from any electromagnetic pulses passing through the said lead will be prevented before their application to the transmitting transducer assembly 28.

The other rectangular end flange 21 of the mercury tank 19 is arranged in opposed relation to a plate or block 29 having an opening (not shown) to accommodate the adjacent end of the mercury tank 19. The flange 21 of the mercury tank is rigidly secured to the block 29, as by screws 30 protruded through the said flange and block.

As best shown in Figure 7, each of the combination transducer and sonic damper assemblies has an annular flange, as at 26a, and a reduced portion 26b (see Figure 3). The flange and the reduced portion of each of the assemblies shown are formed of a novel damping material, indicated generally at 32, which may be formed of metal wool, such as steel wool, embedded in a suitably soft solder, as for example sixty percent (60%) tin and forty percent (40%) lead. By extensive experimentation, it has been found that a somewhat fine grade of steel wool, Grade "0," for example, may be treated, after a preliminary break-up into fragments of a suitable size, by immersion in a hot resin bath and accompanied with several successive tinning operations. We have found that after processing in this manner, the steel wool is conditioned to a state where it will be accepted by the molten soft solder mentioned in suchwise as to form therewith a substantially homogeneous composition particularly adapted for the purpose indicated.

A piezo crystal disc 33 is secured to the outer face of the damping material 32 in any suitable manner, as by a soldering process, the said face having been previously finished to present a highly polished or glass-like surface in order to prevent the occurrence of any pits or indentations which, it will be understood, could occasion interfering reflections from the adjacent piezo crystal. The reduced end 26b of the transducer assembly has a threaded hole 34 accommodating a screw 36 which serves to fasten a soldering bracket 37 thereto and to which the conducting lead 27c is soldered.

It is to be understood at this point that the particles of the steel wool in the solder present a myriad of small reflecting surfaces or acoustic discontinuities which tend to deflect in diverse and random directions the acoustic pulses impinging thereagainst and thus effect a substantial elimination of possible interfering reflections emanating from the receiving transducer assembly back through the mercury in the tank 19 whereby a secondary source of possible interfering reflections are obviated by the similar transducer assembly 28.

The means securing the combination transducer and sonic damper 26 to the mercury tank, it will be understood, are substantially duplicated at the right hand end of the tank with respect to the transmitting transducer assembly 28 and in each case, it will be observed, a liquid seal for the mercury in the tank is provided by spring pressure and an annular adhesive seal around the periphery of crystal 33 and further damping is afforded by the insulating ring 25.

The mercury tank itself, as mentioned above, may be formed of a metal such as stainless steel. This material has been found specially adapted to prevent amalgamation or wetting of the steel by the mercury in addition to its hardness and general resistance to corrosion.

A thermostatic assembly for temperature control of the mercury in the tank 19 is indicated generally at 38 and includes a tubular element 38a formed of glass and containing a column of mercury, as at 38b. Arranged exteriorly on the glass tube 38a and in spaced relation thereon is a plurality of contact members, as at 39, 40, and 41, each having a lead or prong (not shown) projecting into the column of mercury. These contact members are electrically connected by conductors, as at 42, with the soldering posts 13 which, in turn, it is to be understood, are connected by leads (not shown) with the associated electronic computing apparatus.

A heater winding, as at 43, which is serially connected to a heater winding 44 on the exterior of the mercury tank 19, encircles an enlarged end portion of the glass tube 38a and serves to heat the column of mercury within the latter to a predetermined degree, thus assuring a more precise regulation by the thermostatic assembly 38 in order to maintain the mercury in the tank 19 at a desired constant temperature and thereby affording a substantially uniform conducting medium for the transducer assemblies mentioned above.

In practice, the thermostat is arranged to operate at a temperature of 65° C., it being understood that the first contact 39 at the left hand side of the tube 38a is always in engagement with the mercury therein and serves somewhat as a neutral position member.

The second contact member 40 at the center of the tube is employed to de-energize, at a predetermined temperature, the circuit associated with the heater windings 43, 44. This occurs when the expanding mercury column 38B engages the prong on contact member 40 and completes a circuit to an electron tube amplifier (not shown) and utilizes the current cut-off characteristics of the latter to de-energize the last-mentioned circuit while the mercury is in contact with the said contact member 40.

The third contact member 41 is connected to the coil of a sensitive relay whose contacts will remove all power from the electron tube amplifier heater circuit when said relay is energized. This third contact is engaged by the mercury in the event the preceding contact member 40 fails to function after engagement by the said mercury. Under these circumstances the contact member 41 serves as a safeguard against a possible nonfunctioning of contact member 40.

It is to be understood that the mercury is always in engagement with the neutral ring 39 for the establishment of the heating circuit, when the device is in operation, and it is only when the contact ring 40 is engaged by the mercury that the electron tube amplifier mentioned above, is actuated. When this occurs, the circuit is broken momentarily but again completed after about 6 or 7 seconds, thus maintaining an intermittent control over the temperature of the mercury.

This control is sufficiently sensitive to maintain the mercury at a predetermined temperature within 0.2 of a degree. A variation of this small order, therefore, will suffice to effect the energization or de-energization of the temperature-regulating circuit.

The left hand end of the glass tube 38a with its winding 43 is centrally located in a small metallic well or container 43a of suitable heat-conducting material, such as copper, and having a rectangular portion, as at 43e. The interior of the well 43a contains a quantity of finely divided heat-conducting material, such as powdered copper 43b, in which the glass tube 38a is embedded. A neoprene gasket 45, arranged at the right hand end of the well 43a, sealingly embraces the glass tube 38a and is secured in the position illustrated by an inwardly directed annular crimp 43f. A threaded filler opening provided at the left hand of the well 43a is closed by a screw 45a.

The thermostat assembly 38 described above is secured to the tank 19 by a metal strap 43c which latter may be welded or soldered to the said squared end 43e of the well 43a, and has its depending ends secured, as by the screws 43d, to the body portion of the tank. In order to attain a more effective heat-conducting engagement between the metal well and mercury tank, the surface of the copper well is tinplated in order to facilitate its soldering both to the tank and to the metallic strap.

Screws 47 retain the end frame 18 and a juxtaposed stainless steel metal plate 48 in engagement with the collar 22 and the latter, in turn, securely fastened to the flange 20 of the tank 19.

In order to maintain constant pressure within the mercury tank 19, the interior thereof communicates with a threaded duct 49 formed in the body portion thereof, this duct receiving the threaded stem 50 of a member having a plurality of shoulders 51a, 51b, and 51c. A rectangular block 52 rests on the lowermost shoulder 51c while the top shoulder 51a serves as a seat for a gasket 53.

A bottom recess 54 formed in the member 51 accommodates a thin resilient circular disc or diaphragm 55 of a suitable material, such as stainless steel, having a configuration adapted to afford a maximum of resiliency and resistance to distortion. The body portion of this disc is shaped to provide an annular ridge, as at 55a, spaced from the outer edge of the disc and encircling an inner concentric ridge 55b of somewhat less height than the ridge 55a. The disc 55 is seated on the upper end of a spiral spring 56 whose lower portion is located in a circular pocket 57 formed in a block 58 fastened to the member 51 by screws 58a.

As described hereinafter, the spring 46 and the flexible disc 55 adapted to yield under variations of pressure of the mercury in the tube 38a, as it expands or contracts in accordance with temperature variations so that an essentially constant pressure of mercury within the tube may be maintained and a corresponding uniformity of sound propagation also achieved. The tank 19 may be filled or replenished through a threaded opening normally closed by a plug 59.

The general function and mode of operation of the apparatus has been in large measure indicated above, but will be more fully understood from the following brief explanation.

Assuming the tank 19 to have a supply of mercury under a predetermined pressure and with the heater windings of the thermostat 38 and the said tank operably energized, supersonic vibrations produced by electromagnetic pulses applied to and emanating from the crystal transmitting transducer 28 at the right hand end of the mercury tube, will be propagated through the column of mercury in the tank in the form of supersonic vibrations and will impinge against the crystal receiving transducer 26, described above with which the mercury is also in contact. Since the crystal transducers have approximately the same period of acoustic impedance as mercury, they are adapted to vibrate in substantial synchronism with the latter and will therefore deliver electromagnetic pulses or oscillations, corresponding to the period of their mechanical oscillations, to an associated circuit.

The necessary acoustic absorptive qualities may be imparted to the piezo electric transducer mounting by any arrangements for providing acoustic impedance discontinuities which are comparable in size with the wave length of the acoustic energy to be dissipated. While the example illustrated in detail has been directed primarily to steel, bronze, copper, or other metallic wool in a solder or other base of differing acoustic impedance, satisfactory results may also be obtained, under proper circumstances, by the use of a mounting material having numerous pockets or voids whose dimensions are similarly related to the wave lengths of the energy which is to be absorbed.

Suitable results have been obtained, for example, with the material used in "Oilite" bearings from which the entrapped lubricant has been removed by the use of solvents or elevated temperatures. When material characterized by the presence of numerous small voids is used, however, the processes by which the piezo electric transducer is secured to the mount often tend to fill in a substantial number of voids, reducing the acoustic absorptivity to such a degree that, in some applications, the latter type of mount is not entirely suitable.

A characteristic circuit including a single pool mercury storage system of the kind herein described and adapted for electronic computer apparatus, is described in the article referred to above and appearing in the Proceedings of the Institute of Radio Engineers, August 1949. This article describes the capacity of the single pool of mercury for multiple channels of information, so that hundreds of numbers in the form of groups of electrical or acoustical impulses are available for use, permitting the transmission and reception of intelligence at a rate of several million binary digits per second.

While we have described a preferred form of the invention, it is to be understood it is susceptible of some modifications and change without departing from the spirit or essential attributes thereof.

What is claimed is:

1. In an apparatus for the production and control of longitudinal waves in a wave transmitting medium, a transducer element including a piezo crystal, and multi-faceted multifariously reverberating material secured to said crystal, said material comprising metal wool embedded in solder, and said solder comprising a mixture of tin and lead.

2. The combination according to claim 1 wherein said mixture comprises more than fifty percent tin.

3. The combination according to claim 2 wherein said mixture comprises approximately sixty percent tin and approximately forty percent lead.

4. The combination according to claim 1 wherein said metal wool consists of steel.

References Cited in the file of this patent

UNITED STATES PATENTS

| | | |
|---|---|---|
| 1,397,766 | Lidberg | Nov. 22, 1931 |
| 2,044,573 | Hornsberger | June 16, 1936 |
| 2,323,030 | Gruetzmacher | June 29, 1943 |
| 2,415,832 | Mason | Feb. 18, 1947 |
| 2,421,026 | Hall et al. | May 27, 1947 |
| 2,434,255 | Bond et al. | Jan. 13, 1948 |
| 2,448,352 | Carlin | Aug. 31, 1948 |
| 2,503,400 | Mason | Apr. 11, 1950 |
| 2,512,156 | Hoffmann | June 20, 1950 |
| 2,558,012 | Star | June 26, 1951 |
| 2,602,876 | Heinen | July 8, 1952 |
| 2,629,827 | Eckert et al. | Feb. 24, 1953 |